(12) United States Patent
Courpet et al.

(10) Patent No.: US 10,207,432 B2
(45) Date of Patent: Feb. 19, 2019

(54) ASSEMBLY INCLUDING TWO PIPE LENGTHS ASSEMBLED WITH AN INTERFACE JOINT

(71) Applicant: AIRBUS OPERATIONS (SAS), Toulouse (FR)

(72) Inventors: Alexis Courpet, Fronton (FR); Thomas Barre, Fregouville (FR); Olivier Bourbon, Aucamville (FR); Matthieu Biteau, Toulouse (FR); Jean-Marc Roques, Colomiers (FR); Christophe Buresi, Toulouse (FR); Brice Lenoir, Leguevin (FR); Philippe Villeroux, Leguevin (FR)

(73) Assignee: Airbus Operations (SAS), Toulouse (FR)

(*) Notice: Subject to any disclaimer, the term of this patent is extended or adjusted under 35 U.S.C. 154(b) by 535 days.

(21) Appl. No.: 14/572,874

(22) Filed: Dec. 17, 2014

(65) Prior Publication Data
US 2015/0176732 A1    Jun. 25, 2015

(30) Foreign Application Priority Data
Dec. 19, 2013 (FR) .................................... 13 62989

(51) Int. Cl.
*B29C 39/10* (2006.01)
*F16L 25/02* (2006.01)
(Continued)

(52) U.S. Cl.
CPC .............. *B29C 39/10* (2013.01); *F16L 25/01* (2013.01); *F16L 25/025* (2013.01);
(Continued)

(58) Field of Classification Search
CPC ......... F16L 25/01; F16L 25/025; F16L 27/12; F16L 17/02; B64D 45/02; B29C 39/10
(Continued)

(56) References Cited

U.S. PATENT DOCUMENTS 2,966,539 A * 12/1960 Sears ...................... F16L 25/01
174/47 X
3,217,092 A * 11/1965 Sakurada ................ F16L 25/01
285/231 X
(Continued)

FOREIGN PATENT DOCUMENTS

WO    WO 2012/088055    6/2012

OTHER PUBLICATIONS

Search Report with Written Opinion (foreign language) for FR 12652989 dated Mar. 31, 2014, 6 pages.

*Primary Examiner* — Greg Binda
*Assistant Examiner* — Zachary T Dragicevich
(74) *Attorney, Agent, or Firm* — Nixon & Vanderhye P.C.

(57) ABSTRACT

An assembly including a first pipe length and a second accommodating mechanical pipe length, said first length being assembled in said second length by means of an interface joint, that is a conductor of electric current. As it is assumed that said first length and said second length are also conductors of electric current, the joint thus provides good sealing between the first pipe length and the second pipe length in order to prevent leakages of fluid and to prevent the formation of inopportune electric arcs due, for example, to static electricity.

7 Claims, 2 Drawing Sheets

(51) Int. Cl.
   *F16L 25/01* (2006.01)
   *B29L 23/00* (2006.01)
   *F16L 21/08* (2006.01)
   *B64D 37/32* (2006.01)
   *B64D 45/02* (2006.01)

(52) U.S. Cl.
   CPC .......... *B29L 2023/22* (2013.01); *B64D 37/32* (2013.01); *B64D 45/02* (2013.01); *F16L 21/08* (2013.01)

(58) Field of Classification Search
   USPC ...... 285/302, 293.1, 295.1, 295.3, 231, 350; 174/47; 264/259; 439/192; 244/131
   See application file for complete search history.

(56) References Cited

U.S. PATENT DOCUMENTS

| | | | | |
|---|---|---|---|---|
| 4,034,994 | A * | 7/1977 | Ohta | |
| 2002/0106923 | A1* | 8/2002 | Copeland | F16L 25/01 |
| 2010/0025079 | A1* | 2/2010 | Flynn | F16L 27/12 |
| 2010/0045031 | A1 | 2/2010 | Peachy | |
| 2010/0102038 | A1* | 4/2010 | Baum | F16L 25/01 |
| 2010/0226063 | A1* | 9/2010 | West | F16L 25/01 |
| 2011/0148098 | A1* | 6/2011 | Flynn | F16L 25/01 |
| 2013/0059456 | A1 | 3/2013 | Franke | |
| 2014/0246112 | A1* | 9/2014 | Flynn | F16L 25/01 |
| 2016/0273696 | A1* | 9/2016 | Gonzalez Bayon | |

* cited by examiner

ASSEMBLY INCLUDING TWO PIPE LENGTHS ASSEMBLED WITH AN INTERFACE JOINT

This application is the U.S. claims priority to FR 1362989 filed 19 Dec. 2013, the entire contents of which is hereby incorporated by reference.

FIELD OF THE INVENTION

The invention relates to an assembly consisting of two pipe lengths assembled with an interface joint.

PRIOR ART

Inside certain voluminous structures, such as aircraft for example, several zones exist in which different fluids transit through different conduits. Some of these zones are particularly sensitive on account of the nature of the fluid passing through them, and must therefore be the object of special attention as regards safety.

The zone of an aircraft that includes the fuel tank and the associated conduits must therefore imperatively be designed so as to prevent leakages of fuel or other fluids, as well as the production of inopportune electric arcs.

SUMMARY OF THE INVENTION

The assemblies according to the invention allow these two problems to be resolved in a certain and stable manner, while being designed to prevent them from degrading over time.

The object of the invention is an assembly including a first pipe length and a second pipe length, said first length being assembled in said second length by means of at least one interface joint capable of coming into contact with said lengths.

According to the invention, the joint, the first pipe length and the second pipe length are conductors of current, said joint being overmoulded in one of said lengths so as to be in electrical contact with said length.

In this way, the joint has a dual function:
  of ensuring sealing between the two pipe lengths so as to prevent leakages of a fluid that could be present in at least one of the two lengths, and
  of discharging electrical current due, for example, to static electricity, and potentially capable of being created between the two pipe lengths.

Furthermore, by being overmoulded in one of the two pipe lengths, the joint thus possesses positional stability, preventing it from moving and/or becoming deformed during assembly or over time to the extent of being unable to provide its sealing function.

According to a possible characteristic, the first length is capable of penetrating into the second length so that said lengths present an overlap zone, said joint being placed in said zone, while being in contact with the length in which it is not overmoulded.

According to a possible characteristic, the joint extends at least partially along the circumference of the overlap zone.

According to a possible characteristic, the joint is plastic, loaded with carbon black.

According to a possible characteristic, the joint is overmoulded in a recess of the outer surface of the first pipe length.

According to a possible characteristic, the joint is overmoulded in an annular recess of the inner surface of the second pipe length.

According to a possible characteristic, the recess has a bottom hollowed out by a central groove extending the entire length of said recess.

According to a possible characteristic, the overmoulded joint emerges from the recess in such a way as to define a salient flange.

According to a possible characteristic, the joint is hot overmoulded in the first or second pipe length, so that said joint is in direct electrical contact with the length in which it is overmoulded.

According to a possible characteristic, the joint is overmoulded in the first or second pipe length by means of a conductive adhesive, so that said joint is in electrical contact with the length in which it is overmoulded.

According to a possible characteristic, the first length is a tube for supplying a liquid fluid, the second length being a hollow mechanical connector, and said tube being pushed into said connector.

According to a possible characteristic, the tube is a single piece and is made of a material to be chosen among a plastic with carbon black, glass fibre with carbon black, a mixture of glass fibre and plastic with carbon black, and a metal.

According to a possible characteristic, the connector is made of a material to be chosen among a plastic with carbon black, glass fibre with carbon black, a mixture of glass fibre and plastic with carbon black, and a metal.

The invention has, as another object, an aircraft including an assembly according to the invention.

The invention has, as another object, a method of assembling a first pipe length into a second pipe length by means of at least one interface joint. According to the invention, said first pipe length, said second pipe length and said joint are conductors of current, and said at least one joint is overmoulded in at least one of said lengths so as to be in electrical contact with said at least one length, said method including a step for inserting the first length of pipe into the second length of pipe so as to position said at least one joint in electrical contact with the other length.

According to a possible characteristic, an overlap zone is created between the first and the second pipe lengths during said insertion step, the joint being placed in said zone, while being in contact with the length in which it is not overmoulded.

The invention has, as another object, a pipe length. According to the invention, said length is an electrical conductor and has at least one interface joint that is an electrical conductor, said joint being overmoulded in said length so as to be in electrical contact with the latter.

BRIEF DESCRIPTION OF THE DRAWINGS

A detailed description is given below of two possible embodiments of an assembly device according to the invention, making reference to FIGS. 1 to 5.

DETAILED DESCRIPTION

In order to remove any ambiguity, it must be specified that the connector is not an electrical connector in the conventional meaning of the word, but a mechanical receptacle capable of accommodating the extremity of a tube.

Figure 1:
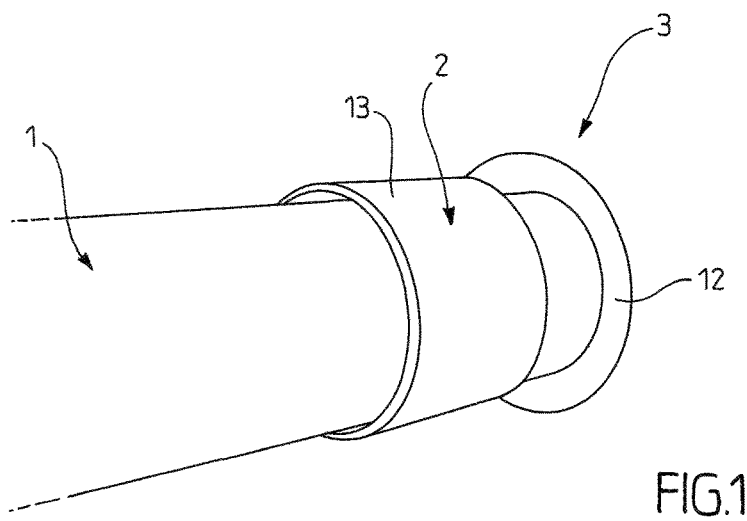
FIG. 1 is a perspective view of an assembly according to the invention.

With reference to FIG. 1, a possible embodiment of an assembly according to the invention includes a first pipe length in the shape of a fuel supply tube 1, and a second pipe length in the shape of a mechanical connector 2, implanted in the structure 3 of an aircraft. This tube 1 can be likened to a hollow single-piece cylinder and is made of a resistive material, such as, for example, a metal or a mixture of thermoplastic polymer and glass fibres loaded with carbon black. The connector 2 is cylindrical and is preferably made of metal or in a plastic loaded with carbon black. It must be specified that said tube 1 and said connector 2 are conductors of electrical current. The inside diameter of the connector 2 is greater than the outside diameter of the tube 1, so that said tube 1 can be assembled in said connector 2 by pushing it in. The connector 2 has an extremity 12, which is attached to the structure, and an opposite free extremity 14, capable of accommodating the fuel supply tube 1.

Figure 2:
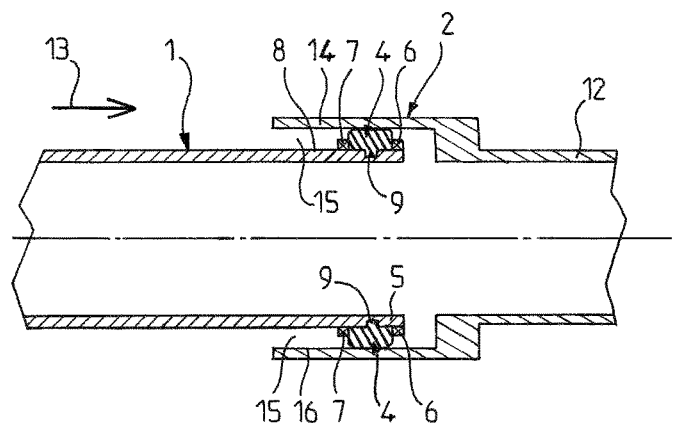
FIG. 2 is a longitudinal section of an assembly according to a possible embodiment of the invention.
Figure 3:
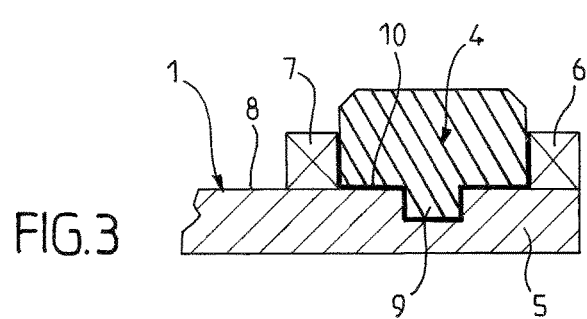
FIG. 3 is a longitudinal section of an overmoulded joint in a tube of the assembly illustrated in FIG. 2.
Figure 4:
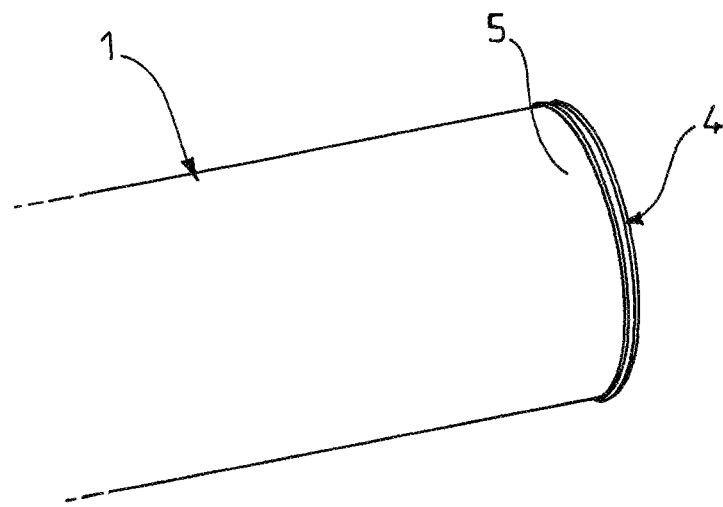
FIG. 4 is a partial perspective view of the tube of the assembly illustrated in FIG. 2.

With reference to FIGS. 2, 3 and 4, a possible embodiment of an assembly according to the invention includes a joint 4 overmoulded in the fuel supply tube 1 at one 5 of its extremity zones. More precisely, in said extremity zone 5, the tube 1 presents an annular recess delimited by two annular shoulders 6,7, projecting from the outer surface 8 of said tube 1. One 6 of said shoulders comes flush with the extremity of the tube 1. The recess extends 360° around the tube 1 and has a cylindrical bottom hollowed out in the wall of the tube 1 by a central annular groove 9, extending the entire length of said recess. The joint 4 is a conductor of electric current and can, for example, be made of a plastic loaded with carbon black. Once the joint 4 has been overmoulded in the recess of the tube 1, it projects from the two shoulders 6, 7 delimiting said recess, while completely occupying the volume of the central groove 9 as well as the volume between said shoulders 6,7. It thus creates a flange, locally and radially widening the zone of the extremity 5 of said tube 1. The central groove 9 is designed to enlarge the contact surface between the joint 4 and the tube 1. In this way, the joint 4 is solidly secured to the tube 1, and the electric current can easily transit between said tube 1 and said joint 4. However, even though the presence of this groove 9 improves the embodiment conditions of an assembly according to the invention, it is not indispensable to such an embodiment.

The joint 4 is deposited in the recess in the tube 1 so that it comes into electrical contact with said tube 1. In order to achieve this result, said joint 4 can:
  either be directly hot overmoulded in the recess of the tube 1. In fact, in this case, the contact between said joint 4 and said tube 1 is sufficiently great to ensure satisfactory electrical contact between these two parts 1, 4,
  or be overmoulded at a lower temperature in said recess after a thin coat 10 of conductive adhesive has been deposited in said recess. In fact, this conductive adhesive 10 will contribute to improving the contact conditions between the joint 4 and the tube 1 and thus allow an electrical contact to be achieved between these two parts 1, 4.

With reference to FIG. 2, once the joint 4 has been satisfactorily overmoulded in the recess of the tube 1, the tube 1 is routed towards the fixed connector 2 so as to present the extremity zone 5 incorporating the joint 4 before said connector 2. The tube 1 is then pushed inside the fixed connector 2 via this extremity zone 5, in the direction indicated by the arrow 13 illustrated in FIG. 2. The assembling of the tube 1 in the connector 2 creates an overlap zone between these two lengths, leaving a free space 15 between the outer surface 8 of said tube 1 and the inner surface 16 of said connector 2. During the push-in phase of the tube 1 in the connector 2, the joint 4 finds itself in this overlap zone and makes close contact with the inner surface 16 of said connector 2. By means of these different assembly phases, a possible embodiment of an assembly according to the invention is obtained, said assembly constituting a tube 1 and a mechanical connector 2, said tube 1 being partially inserted in said connector 2 by means of an interface joint 4 overmoulded in said tube 1.

Figure 5:
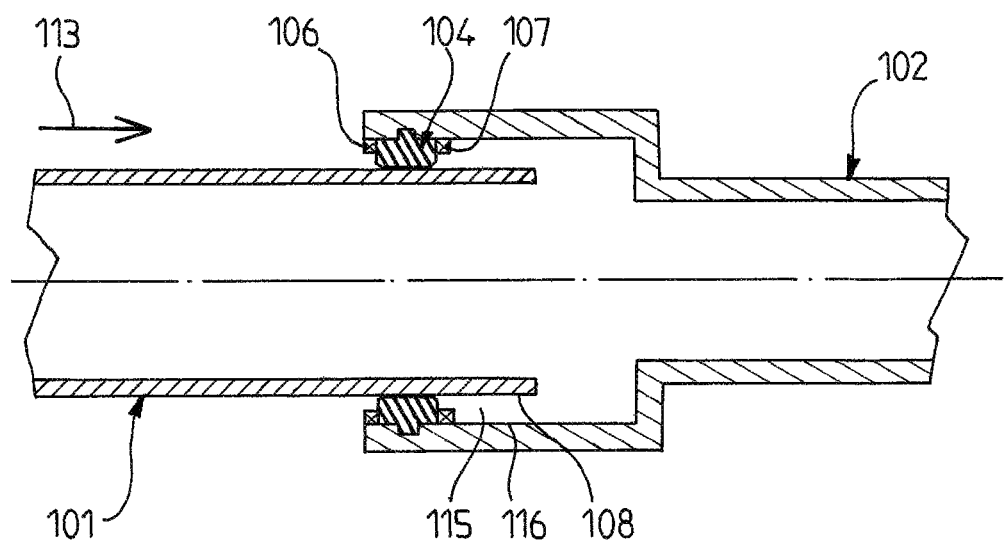
FIG. 5 is a longitudinal section of a tube assembled in a connector according to another possible embodiment of an assembly according to the invention.

With reference to FIG. 5, according to another possible embodiment of an assembly according to the invention, the joint 104 is overmoulded in a recess of the connector 102, in the same conditions as those described previously, when said joint 4 is overmoulded in a recess of the tube 1. For this embodiment, the recess is annular and is delimited by two annular shoulders 106, 107 projecting from the inner surface of the connector 102. One 106 of said shoulders comes flush with the free extremity of the connector 102. The recess extends 360° around the connector 102 and has a cylindrical bottom hollowed out in the wall of the connector 102 by a central annular groove 109, extending the entire length of said recess. Once the joint 104 has been overmoulded in the recess of the connector 102, it projects from the two shoulders 106, 107 delimiting said recess, while completely occupying the volume of the central groove 109 as well as the volume between said shoulders 106, 107. It thus creates a flange, locally and radially reducing the section of the connector 102.

The materials that constitute the joint 104, the connector 102 and the tube 101 are identical to those described for the preceding embodiment. The techniques for overmoulding the joint 104 in the recess of the connector 102 are also similar to those described for the preceding embodiment.

Once the joint 104 has been satisfactorily overmoulded in the recess of the connector 102, the tube 101 is pushed inside the fixed connector 102 in the direction indicated by the arrow 113. The assembling of the tube 101 in the connector 102 creates an overlap zone between these two lengths, leaving a free space 115 between the outer surface 108 of said tube 101 and the inner surface 116 of said connector 102. During the push-in phase of the tube 101 in the connector 102, the joint 104 finds itself in this overlap zone and makes close contact with the outer surface 108 of said tube 101.

Once the tube 1, 101 has been assembled in the connector 2, 102, the joint 4, 104 provides, on one hand, good sealing between these two lengths 1, 101 and 2, 102, while preventing fuel leaks, and on the other, close electrical contact with said lengths 1, 101 and 2, 102 so as to discharge parasite electric currents and to prevent the creation of electric arcs. In fact, it is assumed that the connector 2, 102 is connected to earth via the structure 3 to which it is secured, thus allowing parasite electric currents to be discharged.

An assembly according to the invention offers several advantages:
  it provides enhanced safety within the installation in which it is installed by preventing fuel leaks and the creation of electric arcs due, for example, to static electricity,
  it improves the reliability of the installation,
  it creates reductions of mass,
  it enables the implementation of a fuel supply tube having a specific resistance, variable according to the proportion of carbon injected into said tube.

The invention claimed is:

1. A method of manufacturing a pipe, said method comprising:
    selecting a first length of pipe, the first length of pipe being electrically conductive; and
    forming a seal on the first pipe length by overmoulding an electrically conductive sealing material on the first pipe length such that the seal is overmoulded in an annular recess of an outer surface of the first pipe length and extends into a bottom hollowed out by a central groove that is centered within an axial length of and extends the entire circumferential length of the annular recess,
    wherein the seal is configured to seal between the first pipe length and a second pipe length when the first pipe length and the second pipe length at least partially overlap, and the annular recess is delimited by two annular shoulders with one of the two shoulders being flush with an end of the first pipe length.

2. The method according to claim 1, wherein the seal is formed within an overlap zone between the first pipe length and the second pipe length.

3. The method according to claim 2, wherein the seal extends at least partially along the circumference of the first pipe length within the overlap zone.

4. The method according to claim 1, wherein the electrically conductive sealing material is plastic, loaded with carbon black.

5. The method according to claim 1, wherein the seal is overmoulded in a recess of an outer surface of the first pipe length.

6. The method according to claim 1, wherein the seal is overmoulded in an annular recess of an inner surface of the first pipe length.

7. The method according to claim 1, wherein the first pipe length is a single piece and is made of a material chosen among a plastic with carbon black, glass fibre with carbon black, a mixture of glass fibre and plastic with carbon black, and a metal.

\* \* \* \* \*